United States Patent
Stauβ

(10) Patent No.: US 8,813,344 B2
(45) Date of Patent: Aug. 26, 2014

(54) PROFILE CONNECTOR AND PROFILE COMPOSITE

(76) Inventor: Ulrich Stauβ, Rottweil-Göllsdorf (DE)

( * ) Notice: Subject to any disclaimer, the term of this patent is extended or adjusted under 35 U.S.C. 154(b) by 254 days.

(21) Appl. No.: 13/516,871

(22) PCT Filed: Nov. 30, 2010

(86) PCT No.: PCT/EP2010/007239
§ 371 (c)(1),
(2), (4) Date: Jul. 18, 2012

(87) PCT Pub. No.: WO2011/072799
PCT Pub. Date: Jun. 23, 2011

(65) Prior Publication Data
US 2012/0272508 A1    Nov. 1, 2012

(30) Foreign Application Priority Data
Dec. 18, 2009 (DE) .......................... 10 2009 059 703

(51) Int. Cl.
*B23P 11/00* (2006.01)
*F16B 7/18* (2006.01)
*F16B 7/04* (2006.01)

(52) U.S. Cl.
CPC ........................................ *F16B 7/187* (2013.01)
USPC ........................................ 29/525.11; 403/187

(58) Field of Classification Search
USPC .......... 29/525.11, 525.01, 428; 403/187, 255, 403/252
See application file for complete search history.

(56) References Cited

U.S. PATENT DOCUMENTS

| | | | |
|---|---|---|---|
| 5,192,145 A * | 3/1993 | Rixen et al. .................... | 403/255 |
| 7,549,819 B2 | 6/2009 | Stauss | |
| 2004/0025459 A1 | 2/2004 | Huebner | |

FOREIGN PATENT DOCUMENTS

| | | |
|---|---|---|
| DE | 10200964 B4 | 7/2003 |
| DE | 202004004741 U1 | 5/2004 |
| DE | 202005004374 U1 | 5/2005 |
| EP | 0329074 A2 | 8/1989 |
| EP | 0458069 A1 | 5/1990 |
| EP | 1589236 B1 | 10/2005 |
| FR | 1518329 A | 3/1968 |

* cited by examiner

*Primary Examiner* — John C Hong
(74) *Attorney, Agent, or Firm* — Kacvinsky Daisak Bluni PLLC

(57) ABSTRACT

A profile connector is disclosed for connecting two profile bars. Each profile bar may have an undercut longitudinal groove running parallel to an axis of the profile bar. The profile connector includes a screw having a first drive element, a shank having a male thread, and a screw head for engaging a longitudinal groove undercut of one of the two profile bars. The screw also includes a second drive element on an end of the screw opposite the first drive element. The male thread comprises a self-forming thread. In some embodiments, the profile connector is a two-piece design comprising the screw and a sleeve for receiving the screw. The sleeve includes a male thread for screwing the profile connector into one of the longitudinal grooves of one of the profile bars. The sleeve also includes a female thread corresponding to the male thread of the screw for receiving the screw.

15 Claims, 2 Drawing Sheets

PROFILE CONNECTOR AND PROFILE COMPOSITE

BACKGROUND

The invention relates to a profile connector for connecting together a pair of profile bars each having at least one undercut longitudinal groove running parallel to the respective profile bar axis (i.e., the longitudinal central axis).

EP 0458069 A1 and DE 4016320 C1 disclose three-part profile connectors which include a sleeve-like counter-bearing piece with a male thread. The male thread is a self-cutting thread so that the counter-bearing piece can be screwed into a longitudinal groove of a profile threaded bar without having to precut a thread. In the assembled state, the sleeve-like counter-bearing piece is penetrated by a screw having a male thread. The screw head of the screw is supported against the counter-bearing piece on its face, and the two are screwed together with a sliding block that is accommodated in a second longitudinal groove of a second profile bar. The sliding block engages behind a second longitudinal groove undercut.

The disadvantage of these known profile connectors is that they consist of multiple parts (e.g., three individual pieces). They are also difficult to assemble. In particular, finding the female threaded borehole of the sliding block with the screw can be difficult since the borehole is not visible with the profile bars resting perpendicularly, one on top of the other.

DE 10200964 B4 describes another three-part profile connector, which includes a tool for precutting a female thread into a first longitudinal groove of a first profile bar so that a threaded sleeve can then be screwed into the female thread. As with the previously noted designs, this design suffers from the disadvantage of multiple pieces, and again, the fact that finding the female threaded borehole in the accompanying sliding block with the screw of the profile connector can be difficult in practice. Additional three-part profile connectors are also described in EP 1589236 B1, DE 202004004741 U1 and DE 202005004374 U1. Further, EP 15892361 discloses an arrangement in which the self-forming male thread of the counter-bearing piece (i.e., the sleeve) is not a cut thread, but rather is a self-forming rolled thread without cutting edges, so that when turned into the first longitudinal groove, the sleeve-like counter-bearing piece forms a mating thread in the longitudinal groove via non-cutting, compressive material displacement.

The disadvantage of all the aforementioned profile connectors is that they include multiple parts, and they suffer from the difficulty of finding the female threaded borehole of the sliding block with the male threaded screw.

SUMMARY

Proceeding from the aforementioned prior art, the object of the invention is to provide a profile connector having less than three pieces, and which is easy to assemble. The object is further to provide a profile composite comprising such an improved profile connector.

The disclosed profile connector thus includes a screw having a first drive, a shank with a male thread, and a screw head for engaging a longitudinal groove undercut of a profile bar. The invention further relates to a profile composite comprising a first profile bar with at least one first undercut longitudinal groove running parallel to the first profile bar axis, and a second profile bar that is preferably arranged perpendicular to the first profile bar, the second profile bar having at least one second undercut longitudinal groove running parallel to the second profile bar axis and at least one profile connector.

This object is achieved in terms of the profile connector and the profile composite with the features recited in the claims, as well as through the use of such a profile connector for connecting two profile bars.

Advantageous further developments of the invention are indicated in the sub-claims. All combinations of at least two features disclosed in the specification, claims and/or figures fall within the framework of the invention. To prevent repetition, features disclosed relative to the device will also be regarded as disclosed and claimable for the method. The features disclosed relative to the method will also be regarded as disclosed and claimable for the device.

In order to avoid the difficulty of finding the sliding block used in prior art, the invention proposes that the sliding block be eliminated. Instead, the screw of the profile connector includes a male thread configured to engage a first longitudinal groove of the first profile bar, and a screw head configured so that it can be laterally inserted into the second longitudinal groove of the second profile bar to engage the second longitudinal groove undercut. In this way, the screw cannot be removed or guided out of the second longitudinal groove in a direction perpendicular to the longitudinal extension of the groove. In contrast to known profile connectors, the screw head of the present invention engages the second profile bar, and not the first profile bar. As such, the screw head is positioned on an end of the screw adjacent the second profile bar running perpendicular to the longitudinal extension of the screw. As will be appreciated, providing such a screw head makes it possible to eliminate the separate sliding block which must be introduced into the second longitudinal groove, so that the profile connector according to the invention exhibits at least one component less than known profile connectors. In addition, the disclosed arrangement advantageously eliminates the need for the complicated and tedious process of looking for and finding a sliding groove female threaded borehole (as is required when using a separate sliding block), so that assembly takes place more quickly and easily when using a profile connector design based on the concepts described in the invention.

As opposed to the known profile connectors, the male thread of the disclosed screw is not used to establish a positive connection with a (nonexistent) sliding block, but rather is screwed directly into the first profile bar according to a first alternative to be elaborated upon later (i.e., to establish a direct, positive connection between the screw of the profile connector and the first profile bar), or in a second alternative, is screwed with the female thread of male threaded sleeve, the male thread of which is designed to be directly screwed with the first profile connector. The embodiment of the profile connector according to the first alternative is especially preferred, since the correspondingly designed screw is the only profile connector component in this case. The embodiment according to the second alternative provides a two-part profile connector.

In order to facilitate screwing the disclosed profile connector (or more precisely, the screw of the profile connector), into the profile bar or alternatively into the male threaded sleeve, one end of the screw head side is provided with a first drive. In some embodiments, the first drive may be a polygonal drive such as a hexagonal drive, or alternatively a star drive. In other embodiments, a second drive is provided on an end of the screw opposite to that of the first drive. The second drive may be provided on the end of the screw lying in the screw tightening direction, so that the screw may be screwed in using the first drive, and then can be tightened in a second assembly step using the second drive. The second drive can be accessed through the longitudinal groove in the first profile bar, using for example with a spherical head-Allen wrench. Tightening cannot take place with the first drive, since it is obscured by the second profile bar once the second profile bar is engaged with the screw head, and thus, is not accessible to a tool. The first and/or second drive can be designed as an internal drive, for example a hexagonal drive, or as an external drive.

In comparison to the cited prior art, configuring the profile connector according to the invention as a whole eliminates at least one component, and preferably two components, and simplifies assembly by eliminating the need for a sliding block.

In some embodiments, the male thread of the screw (additionally or alternatively the male thread of the sleeve yet to be described later) is provided with an anti-friction coating to facilitate the process of screwing it into engagement with the longitudinal groove of the first profile bar. In some embodiments, the anti-friction coating can be oil-based in its construction. The anti-friction coating is preferably silicone-free. For example, it can consist of OGS 1300®. As an alternative, the composition of the anti-friction coating can be silicone-based and/or graphite-based and/or $MbS_2$-based.

As will be appreciated by one of skill in the art, a variety of different options exist with respect to the specific configuration of the drives. For example, one or both drives can be designed as polygonal drives or star drives. In some embodiments, the drives may be identical in design so that both drives can be actuated with the same tool, thus eliminating the need to change tools during assembly.

In some embodiments it may be desirable to establish an electrically conductive connection between the profile bars that are connected together. Thus, contact means may be provided on an underside of the screw head. These contact means can be used to puncture (i.e., damage) an insulating layer applied to the profile connector engaging the screw head, thus ensuring that an electrical connection is maintained between the profile bars. In some embodiments, the insulating layer is an oxide layer comprising aluminum. In one non-limiting exemplary embodiment, the contact means include one or more pointed teeth disposed on the underside of the screw head. In another embodiment, the contact means comprises a surface having a roughness that differs from the roughness of the other screw head surfaces. The screw itself may be electrically conductive (i.e., it may exhibit an electrically conductive surface). While electrical contact with the first profile bar may be via the contact means, electrical contact with the other profile bar is established either directly via the male thread of the screw, or indirectly via the male thread of the screw and directly via the male thread of a male threaded sleeve (to be described in greater detail later), which itself is screwed to the profile bar.

In some embodiments the one-part or two-part profile connector may be fabricated through cold forming, in particular cold extrusion, making it possible to forego a complicated machining process.

To facilitate the introduction of the screw into the first longitudinal groove of the first profile bar, the screw may include a guiding section positioned between a distal end of the screw and the male thread. In one embodiment the guiding section is thread-free, and is dimensioned in such a way that it can be introduced into the first longitudinal groove of the first profile bar to result in especially little play between the screw and the first profile bar (e.g., 1 mm or less, and preferably less than 0.5 mm). In addition to facilitating introduction, the guiding section prevents the screw from jamming when directly screwed to the wall of the first longitudinal groove of the first profile bar.

It may also be advantageous to provide a guiding section in the embodiment variant including a male threaded sleeve as previously described. With such an arrangement, the guiding section may be dimensioned so that it can be axially introduced into a female threaded through-borehole of the male threaded sleeve without any resistance, and preferably with little play. The guiding section may have a cylindrical configuration in both aforementioned cases.

In some embodiments the male thread of the screw or male thread of the sleeve may be a buttress thread which includes two thread flanks inclined to different degrees. The less inclined flank may face the screw head, while the other flank may fac away from the screw head. This arrangement can make it harder for the screw or the sleeve to detach from the profile bar on its own. As such, the disclosed design enhances resistance to withdrawal of the screw (or sleeve0 in the direction of the screw head.

Depending on the application, and as desired, the male thread of the screw or sleeve can be designed as a left or right-hand thread.

As previously mentioned, the profile connector has a one-part design according to a first embodiment, and consists of the described screw. In order not to have to separately form (e.g., cut), a female thread into the wall of the first longitudinal groove using a separate tool, the male thread of the screw may be of a self-forming design. In a first alternative, the male thread can be self-cutting in design, (i.e., it may exhibit a cutting edge). Alternatively the male thread may be a self-forming rolled thread without cutting edges, such that the mating thread can be formed in the longitudinal groove via a non-cutting, compressive material displacement mode. Also contemplated is an embodiment in which the male thread is designed as a conventional thread that interacts with a mating thread in the first longitudinal groove that has been pre-formed in a separate operation. In each case, the male thread of the screw can be used in a one-part embodiment variant to manufacture a direct, preferably electrically conductive, positive fit between the screw and the first profile bar.

In another alternative embodiment, the profile connector comprises a two-part design. Thus, in addition to the screw, the profile connector includes a (male threaded) sleeve for engagement with the screw. The threaded sleeve may include a male thread for directly interacting with the wall of the first longitudinal groove of the first profile bar. The male thread can be a self-forming thread, or it may be a conventional, non-self-forming thread, which mates which a corresponding mating thread that has been pre-formed in the wall of the first longitudinal groove using a threading tool. As regards the self-forming male thread, multiple alternative arrangements are possible. For example, the threads may be self-cutting, machined, or non-cuttingly formed using corresponding rolled threads. In addition to the male thread, the sleeve may include a female thread for positively connecting the male-threaded screw with the sleeve. In some embodiments, the axial extension of the screw shank may be greater than the axial extension of the sleeve, thereby ensuring optimal access to the end of the screw containing the second drive.

The invention further relates to the use of a profile connector, as previously described, for constructing a profile composite comprising two profile bars. In some embodiments, the profile bars are situated perpendicular to each other such that the face of the second profile bar rests on a longitudinal side of the first profile bar. The screw shank or sleeve may be accommodated in a first longitudinal groove of the first profile bar, while the screw head may engage the second longitudinal groove undercut associated with the second longitudinal groove. The two profile bars may be tightened using the second drive, which can be accessed from the side of the first longitudinal groove. The process of screwing into the first longitudinal groove or sleeve occurs with the first drive which is oriented on the end of the screw opposite the second drive (i.e., opposite the screw tightening direction). In cases where a one-part profile connector consisting of the screw is used, the male thread of the screw is directly screwed into the first profile bar (i.e., such that the male threads of the screw engage the circumferential wall of the longitudinal groove) so as to contact the longitudinal groove at three or more locations (depending on the groove geometry) which are spaced apart from each other in the circumferential direction. Since the male thread diameter is greater than the diameter of an imaginary circle arranged in a plane lying perpendicular to the longitudinal extension of the longitudinal groove, the male thread will desirably contact the inner groove wall at three locations spaced apart about the circle.

In the embodiment in which a male threaded sleeve is provided in addition to the screw, the male thread of the screw may be screwed into engagement with a female thread of the sleeve. The sleeve, in turn, may be positively screwed (via its male thread) into the wall of the first longitudinal groove. In one embodiment, the male threads of the sleeve form the mating female grooves in the wall of the first longitudinal groove. Preferably, the male threads of the sleeve will engage the wall of the first longitudinal groove in three or more regions spaced apart from each other in the circumferential direction.

To achieve optimal inter-engagement of the two profile bars, a further development advantageously provides that the profile bars be fixed relative to each other by means of two, preferably parallel, profile connectors.

Additional advantages, features and details of the invention may be gleaned from the following description of preferred exemplary embodiments, as well as based on the drawings.

BRIEF DESCRIPTION OF THE DRAWINGS

In the figures, identical elements and identically functioning elements are marked with the same reference numbers.

DETAILED DESCRIPTION

Figure 1:
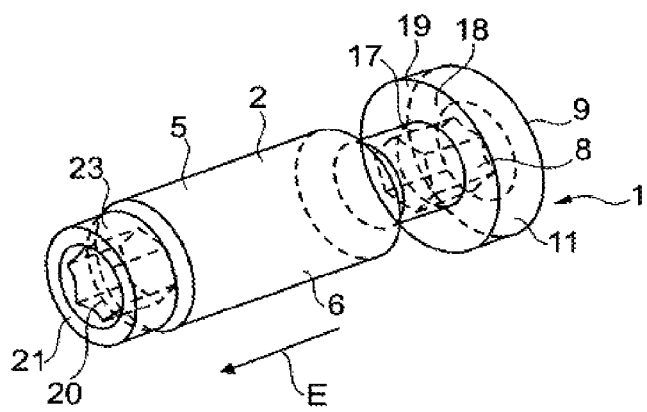
FIG. 1 is a perspective view of an exemplary one-part profile connector consisting of a screw.
Figure 3:
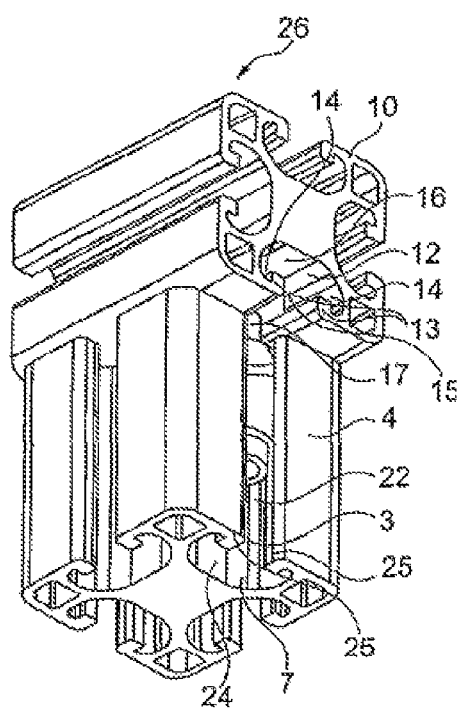
FIG. 3 is a perspective view of an exemplary profile composite, comprising two profile bars aligned orthogonally to each other, as well as a profile connector.
Figure 4:
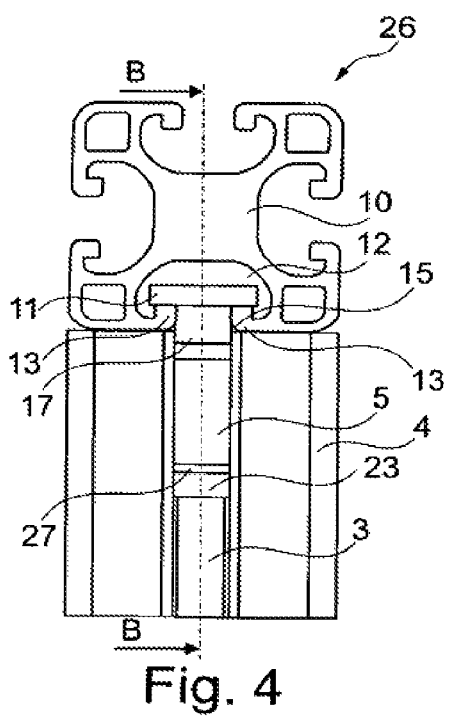
FIG. 4 is a side view of the profile composite of FIG. 3.

FIG. 1 shows a one-piece profile connector 1, which generally comprises a screw 2. The screw 2 is threaded in a first screw tightening direction (along the direction of arrow "E") into a first longitudinal groove 3 (see FIG. 3) of a first profile bar 4. The screw 2 may have a male thread 6 formed on the shank 5 thereof. In one embodiment, the first profile bar 4 is made from a light metal alloy, and the male threads 6 are of a self-forming design, so that as the male thread 6 is screwed into the groove, the male thread contacts the wall 7 of the first longitudinal groove 3 and forms a mating female thread in the groove wall that corresponds with the male thread. A first drive 8, which, in the illustrated embodiment, is a hex socket drive, is provided on a first end 9 of the screw 2. The first end 9 of the screw 2 is positioned opposite to the screw tightening direction "E." Thus arranged, rotating the screw 2 using the first drive 8 screws the screw 2 into the first longitudinal groove 3 of the first profile bar 4 along the direction of arrow "E." Although the first drive 8 may comprise a polygonal (e.g., hex) recess, it will be appreciated that an external drive can also be used. Once the screw 2 has been screwed into the first longitudinal groove 3 of the first profile bar 4, a second profile bar 10 is laterally slipped onto the screw 2, so that a screw head 11 of the screw 2 is introduced into a second longitudinal groove 12 of the second profile bar 10 (see FIGS. 3 and 4). Specifically, the screw head 11 is inserted into the second longitudinal groove 12 so that the head engages behind an undercut 14 of the second longitudinal groove. As can be seen in FIGS. 3 and 4, the longitudinal groove undercut 14 is formed by a pair of legs 13 disposed in opposing relation such that that they face each other across the second longitudinal groove 12. In one non-limiting exemplary embodiment, the second profile bar 10 is made out of a light metal alloy similar to that described in relation to the first profile bar 4, and has an identical cross sectional shape as the first profile bar 4. The two legs 13 border a narrow groove cross section 15, adjacent to which is situated a deeper, wider groove section 16 configured to receive the screw head 11. The diameter of the screw head 11 is larger than the width of the narrow groove cross section 15 so that it cannot pass therethrough. The screw head 11 is additionally dimensioned in such a way that it can be completely received within the wide groove cross section 16. That is, the screw head 11 has a height that is smaller than a depth extension of the wide groove cross section 16, and a diameter that is smaller than a width extension of the wide groove cross section 16.

As can best be seen in FIG. 4, the narrow groove cross section 15 of the second profile bar 10 receives a reduced-diameter axial section 17 of the screw 2, which is located between the screw head 11 and the male thread 5. In the illustrated embodiment, the screw head 11 has a greater diameter than the outer diameter of the male thread 5. In some embodiments, contact means 19, which may, for example, be one or more small teeth, can be provided on an annular underside 18 of the screw head 11. The contact means 19 may be used to damage an electrically insulating oxide layer of the second profile bar 10, so as to establish an electrically conductive connection between the profile bars 4, 10.

Once the second profile bar 10 has been slipped onto the screw 2 in the previously described manner (i.e., by slipping the screw head into the second longitudinal groove 12), the screw 2 is tightened using a second drive 20 which is disposed on a second end 21 of the screw. As can be seen, the second end 21 of the screw 2 is positioned on an axially opposite end of the screw from the first end 9. In the illustrated embodiment, the second drive 20 is identical to the first drive 8, although it will be appreciated that the second drive 20 can be of a different design than the first drive 8. As can be seen in FIGS. 3 and 4, the second drive 20 can be accessed via a narrow groove cross section 22 of the first longitudinal groove 3 using a driving tool whose end is configured to mate with the second drive. In one embodiment, the driving tool has an end exhibiting a spherical sheath contour. Tightening the screw 2 via the second drive 20 braces a longitudinal side of the first profile bar 10 against a face of the first profile bar 4, thus fixing the first and second profile bars tightly together.

As shown in FIG. 1, a cylindrical thread-free guiding section 23 is provided between the male thread 5 and the second end 21 of the screw 2. The guiding section 23 has a diameter sized to enable it to be introduced through a face of the profile bar 4 into the first longitudinal groove 3, with little play (in one embodiment, about a few tenths of a millimeter), thus making it easier to find the first longitudinal groove 3 with the guiding section 23. The guiding section 23 serves to guide the screw 2 into the (first) wall 7 of the first longitudinal groove 3 while screwing in the male thread 5, thus preventing jamming of the screw 2 in the process of screwing in using the first drive 8.

In the illustrated embodiment, the profile bars 4, 10 do not include a central borehole. It will be appreciated, however, that the profile bars 4, 10 can be provided with a variety of different configurations, with the only requirement being that both profile bars 4, 10 include at least one longitudinal groove 3, 12 running parallel to the longitudinal extension of the respective profile bar 4, 10. The longitudinal groove 3, 12 of each bar should have the configuration previously described in relation to the first and second profile bars 4, 10.

As best illustrated in FIG. 3, the male thread 5 of the screw 2 depicted in FIG. 1 engages (i.e., is screwed into) three regions of the groove wall 7. The three regions may be spaced apart in the circumferential direction, such as the slot bottom 24 and legs 25 (i.e., longitudinal groove undercuts) of the first longitudinal groove 3 bordering on the narrow groove cross section 22.

FIG. 4 shows a side view of the profile composite 26 illustrated in perspective in FIG. 3. The two profile bars 4, 10 are arranged orthogonally relative to each other, and it can be seen that the first profile bar 4 receives the male thread 5 of the screw 2 in its first longitudinal groove 3, while the second longitudinal groove 12 accommodates the screw head 11, which laterally protrudes over the narrower groove cross section 15. The screw head 11 engages the legs 13 disposed on opposite sides of the longitudinal groove undercut 14. In the exemplary embodiment shown, the legs 13 have an approximately L-shaped contour. It will be appreciated, however, that the profile connector 1 can be used with legs 13 having a different contour, for example a straight contour, with the only requirement being that the groove have a narrow groove cross section and a deeper, wider, groove cross section for receiving the screw head 11 in the manner previously described.

As clearly shown in FIG. 4, the narrow groove cross section 15 receives the reduced-diameter axial section 17 of the screw 2. The reduced-diameter axial section 17 is connected to the male thread 5 section, which in turn is connected to the front guiding section 23. As can be seen, a conical transition section 27 provided between the male thread 5 section and the guiding section 23.

Figure 5:
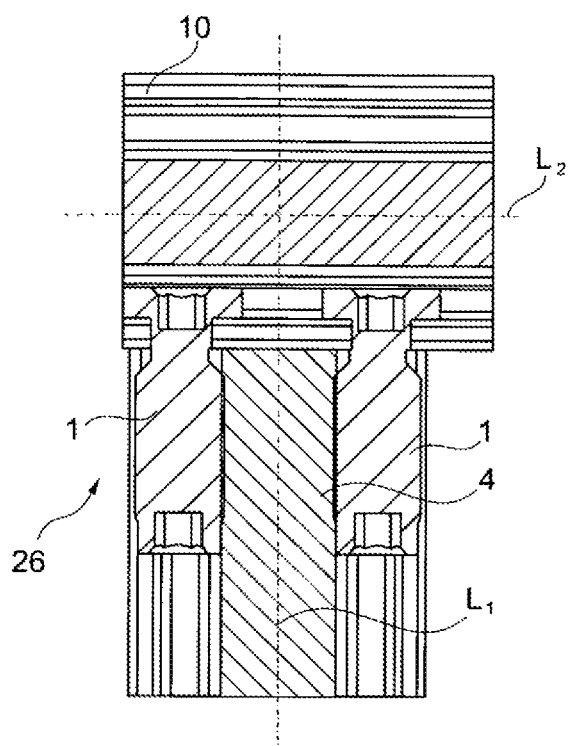
FIG. 5 is a longitudinal, sectional view taken along line B-B of FIG. 4, showing the installation of two one-part profile connectors for coupling the two profile bars.

FIG. 5 shows the profile composite according to FIG. 4 in cross-section, taken along line B-B of FIG. 4. This cross-section shows the first profile bar 4 with its profile bar axis $L_1$ (longitudinal axis), oriented perpendicular to the profile bar axis $L_2$ (longitudinal axis) of the second profile bar 10. As can be seen in FIG. 5, the illustrated profile composite 26 includes a pair of profile bars 4, 10 coupled with two identically configured profile connectors 1, each having a shank 5 of the connector received in opposing first longitudinal grooves 3 of the first profile bar 3, and a head 11 received in the second longitudinal groove 12 of the second profile bar 10. It will be appreciated, however, that a single profile connector 1 could be used to couple the profile bars 4, 10 together.

Figure 2:
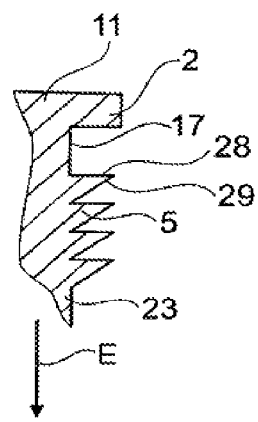
FIG. 2 is a partial section view of the profile connector screw of FIG. 1.

Referring to FIG. 2, a preferred exemplary embodiment of the screw 2 is shown in a partial cross-section view. This view shows that the male thread 5 is a buttress thread having first and second thread flanks 28, 29. The first thread flank 28 may face the underside of the screw head 11, while the second thread flank 29 may face generally in the opposite direction (i.e., toward the screw tightening direction "E.") The first thread flank 28 may have an inclination that is less than an inclination of the second thread flank 29. Thus, as can be seen in FIG. 2, the first thread flank 28 may have a surface that is substantially parallel to the underside surface of the screw head 11, while the second thread flank 29 has a surface that forms an acute angle with respect to the underside surface of the screw head 11. This configuration of the male thread 5 makes it difficult for the screw 2 to withdraw from the first profile bar 4 on its own.

Figure 6:
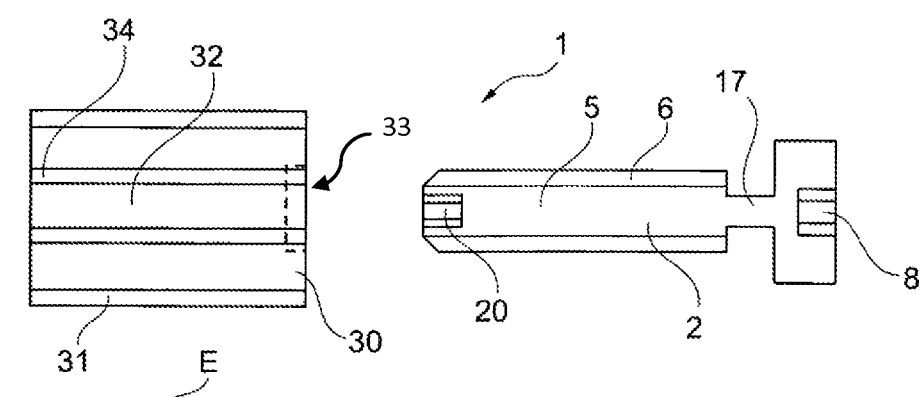
FIG. 6 is an exploded view of an exemplary two-part profile connector consisting of a screw and a male threaded sleeve.

FIG. 6 shows an alternative exemplary embodiment of the disclosed profile connector 1. In this embodiment, the profile connector consists of two parts, as opposed to the single-piece embodiment of FIGS. 1-5. The profile connector 1 of FIG. 6 includes a sleeve 30 having a sleeve male thread 31 configured to engage the wall 7 of the first longitudinal groove 3 of the first profile bar 4 in the same manner as described in relation to the male thread 5 of the single-piece embodiment. The sleeve male thread 31 may be a self-forming thread of the type described in relation to male thread 5. In order to screw the sleeve 30 into the first profile bar 4, the sleeve 30 may include a sleeve drive 33 at one end. The sleeve drive may be configured similarly to the first and/or second drive 8, 20 described in relation to FIGS. 1-5. In some embodiments, a sleeve drive can be provided on both ends of the sleeve 30. The end of the sleeve facing away from the depicted sleeve drive 33, (i.e., lying in the screw tightening direction (arrow "E")), may be provided with a guiding section. This guiding section may have an outer diameter that is smaller in relation to the outer diameter of the sleeve male thread 31, so that the guiding section can be inserted into the first longitudinal groove 3 with play and free of resistance, thereby making it easier to find the first longitudinal groove 3 and preventing the sleeve 30 from jamming during the screwing process.

The sleeve 30 may include a female threaded borehole 32 having a female thread 34 that corresponds with the male thread 6 of the screw 2. In some embodiments, the male thread 6 is a non-self-forming thread. As compared to the embodiment of FIGS. 1-5, the screw 2 of the FIG. 6 embodiment may have a smaller diameter in the region of the male thread 6. The male thread is configured so that the screw 2 can be screwed into the sleeve 30 via the interaction of the male thread 6 and the female thread 34. The screw 2 includes drives 8, 20, which may be located and configured similarly to the drives described in relation to the FIGS. 1-5 embodiment. Thus arranged, the screw 2 can be screwed to the sleeve 30 (which is fixed in the first profile bar 4) using the first drive 8. Thereafter, the screw 2 can be tightened using the second drive 20 to brace the two profile bars 4, 10 tightly together. In the exemplary illustrated embodiment, the screw 2 includes a reduced-diameter axial section 17 positioned between the screw head and the male thread 6. The reduced-diameter axial section 17 may be sized to be received within the narrow groove cross-section 15 of the first profile bar 4. This axial section need not be "reduced," as compared to the male thread 6 section, as long as it is small enough to be received within the narrow groove cross-section. In addition, the axial section 17 may include the male thread 6 if desired. To ensure easy access to the second drive 20 using an appropriate tool, the axial extension of the screw 2 can be selected so that the second drive 20 is located at least partially, and preferably completely, outside of the sleeve 30 when the screw 2 is screwed fully into the sleeve 30.

REFERENCE LIST

1 Profile connector
2 Screw

3 First longitudinal groove
4 First profile bar
5 Shank
6 Male thread
7 Wall
8 First drive
9 First axial side
10 Second profile bar
11 Screw head
12 Second longitudinal groove
13 Leg
14 Longitudinal groove undercut
15 Narrow groove cross section
16 Wide groove cross section
17 Reduced-diameter axial section
18 Underside
19 Contact means
20 Second drive
21 Second axial side
22 Narrow groove cross section
23 Guiding section
24 Slot bottom
25 Leg
26 Profile composite
27 Transition cone
28 First thread flank
29 Second thread flank
30 Sleeve
31 Sleeve male thread
32 Female threaded borehole
33 Sleeve drive
34 Female thread
E Plane
$L_1$ First profile bar axis
$L_2$ Second profile bar axis

The invention claimed is:

1. A profile connector for connecting two profile bars, each profile bar having at least one longitudinal groove undercut running parallel to an axis of the respective profile bar, the profile connector comprising:
   a screw having a first drive element disposed at a first end, a shank having a male thread, and a screw head for engaging a longitudinal groove undercut of one of the two profile bars,
   wherein the screw includes a second drive element on a second end of the screw opposite the first end, the male thread comprising a self-forming thread.

2. The profile connector of claim 1, wherein the male thread is provided with an anti-friction coating.

3. The profile connector of claim 1, wherein the first and second drive elements comprise polygonal drives or star drives.

4. The profile connector of claim 1, wherein an underside of the screw head is provided with contact means comprising one or more teeth or a roughened segment, the contact means configured to damage an electrically insulating layer of the profile connector associated with the screw head.

5. The profile connector of claim 1, wherein at least one of the profile bars is a cold formed part.

6. The profile connector of claim 1, wherein the screw includes a thread-free guiding section disposed between a distal end of the screw and the male thread, the thread-free guiding section having a diameter that is smaller than a diameter of the male thread.

7. The profile connector of claim 1, wherein the male thread is a buttress thread comprising two thread flanks having different degrees of inclination, and wherein the less inclined flank is oriented to face the screw head.

8. The profile connector of claim 1, wherein the profile connector comprises a single piece comprising the screw, the male thread is a self-forming thread or a non-self forming thread, the self forming thread is selected from the list consisting of self-cutting and non-cut-forming, and the male thread is configured to establish a direct positive fit by screwing the profile connector into one of the longitudinal grooves of one of the profile bars.

9. A method for using the profile connector of claim 1 to construct a profile composite, the profile composite comprising a first profile bar having at least one first undercut longitudinal groove running parallel to a first profile bar axis and a second profile bar having at least one second undercut longitudinal groove running parallel to a second profile bar axis.

10. The profile connector of claim 1, wherein the profile connector comprises a two-piece design comprising the screw and a sleeve for receiving the screw, the sleeve exhibiting a sleeve male thread comprising a self-forming thread for engaging the first profile bar by screwing into one of the longitudinal grooves, the sleeve further comprising a female thread corresponding to the male thread of the screw for receiving the screw.

11. The profile connector of claim 10, wherein the self-forming thread comprises a self-cutting thread or a non-cut-forming thread.

12. A profile composite comprising:
   a first profile bar having at least one first undercut longitudinal groove running parallel to an axis of the first profile bar,
   a second profile bar having at least one second undercut longitudinal groove running parallel to an axis of the second profile, and
   a profile connector according to claim 1, wherein the shank of the screw engages the first undercut longitudinal groove, and the screw head engages the second undercut longitudinal groove.

13. The profile composite of claim 12, wherein the male thread of the screw is directly screwed to the first profile bar.

14. The profile composite of claim 12, wherein the male thread of the screw is screwed to a female thread of a sleeve, and wherein the sleeve is received in the first longitudinal groove of the first and second profile bars.

15. The profile composite according to claim 12, wherein the first profile bar includes at least two of said first longitudinal grooves, each of which first longitudinal grooves accommodating a respective said profile connector.

* * * * *